US 6,588,475 B1

(12) United States Patent
Simon, Jr. et al.

(10) Patent No.: US 6,588,475 B1
(45) Date of Patent: Jul. 8, 2003

(54) DEVICE AND METHOD FOR WELDING OVERLAPPING ROOF MEMBRANES

(75) Inventors: James J. Simon, Jr., Poland, OH (US); Scott M. Bockelman, Highland, MI (US); Don Dubuc, Ocala, FL (US)

(73) Assignee: NTE Equipment, Inc., Youngstown, OH (US)

( * ) Notice: Subject to any disclaimer, the term of this patent is extended or adjusted under 35 U.S.C. 154(b) by 229 days.

(21) Appl. No.: 09/736,557

(22) Filed: Dec. 13, 2000

(51) Int. Cl.⁷ .......................... B32B 31/28; B32B 31/00
(52) U.S. Cl. ........................ 156/359; 156/359; 156/378; 156/497; 156/499; 156/574; 156/577; 126/271.1; 126/271.1 R; 431/75; 431/79; 431/280; 431/281; 431/285
(58) Field of Search .................. 126/271.1, 271.2 R, 126/271.2 A, 271.2 B, 271.2 C, 271.3; 156/359, 497, 499, 577, 574, 82, 378; 431/18, 75, 78, 79, 278, 280, 281, 285

(56) References Cited

U.S. PATENT DOCUMENTS

| | | | | | |
|---|---|---|---|---|---|
| 2,153,900 | A | * | 4/1939 | Taber | 47/2 |
| 2,174,477 | A | * | 9/1939 | Wilson | 337/33 |
| 3,108,586 | A | * | 10/1963 | Wilson | 126/271.2 A |
| 3,291,118 | A | * | 12/1966 | Wilson | 126/271.2 R |
| 3,362,397 | A | * | 1/1968 | Murphy | 126/271.2 A |
| 3,636,939 | A | * | 1/1972 | Sijbring | 126/271.2 R |
| 3,724,445 | A | * | 4/1973 | Cutler | 126/271.2 A |
| 3,727,346 | A | * | 4/1973 | Kramer | 47/1.44 |
| 4,061,519 | A | * | 12/1977 | Hammer | 156/244.17 |
| 4,239,581 | A | * | 12/1980 | Lang | 156/497 |
| 4,259,142 | A | * | 3/1981 | Kortepeter | 156/497 |
| 4,440,588 | A | * | 4/1984 | Stevenson et al. | 156/157 |
| 4,725,328 | A | * | 2/1988 | Arnold | 156/380.9 |
| 4,743,332 | A | | 5/1988 | Black | |
| 4,761,201 | A | * | 8/1988 | Nichols, Jr. | 156/497 |
| 4,834,828 | A | | 5/1989 | Murphy | |
| 4,869,044 | A | * | 9/1989 | Wald | 52/746.11 |
| 4,918,844 | A | * | 4/1990 | Marsh | 37/197 |
| 5,072,097 | A | | 12/1991 | Miller | |
| 5,110,398 | A | * | 5/1992 | Murphy | 156/499 |
| 5,234,533 | A | | 8/1993 | Neal | |
| 5,518,560 | A | * | 5/1996 | Li | 156/64 |
| 5,935,357 | A | | 8/1999 | Hubbard et al. | |
| 6,129,809 | A | * | 10/2000 | Ellenberger et al. | 156/351 |
| 6,227,762 | B1 | * | 5/2001 | Van Velsor | 404/95 |
| 6,451,152 | B1 | * | 9/2002 | Holmes et al. | 156/272.8 |

* cited by examiner

*Primary Examiner*—Carl D. Price
(74) *Attorney, Agent, or Firm*—Robert J. Herberger

(57) ABSTRACT

A device for welding overlapping roof membranes comprising a chassis, an air discharge chute and a flame distribution assembly communicating with the air discharge chute. The flame distribution assembly includes a gaseous fuel source inlet, a primary burner, and an ignition source. A control unit ignites the primary burner by the ignition source. The blower connected to an inlet port of the air discharge chute directs heat generated by the primary burner through an air discharge outlet for welding the overlapping roof membranes.

21 Claims, 6 Drawing Sheets

DEVICE AND METHOD FOR WELDING OVERLAPPING ROOF MEMBRANES

FIELD OF THE INVENTION

This invention relates to a device for applying heat weldable modified bitumen or asphalt based rolled roofing material to roof surfaces and a method for applying the same. More specifically, this invention relates to a device and method for welding overlapping roof membranes using a flame as an heating source.

BACKGROUND OF THE INVENTION

Modified bitumen or asphalt based rolled roofing material is applied to roof surfaces, particularly flat roof surfaces, to seal the roof and underlying structure from rain, snow and other natural conditions. These roofing materials are commonly available in rolls of various widths, the largest of which is 39 inches. Each roll has a length of approximately 33 feet. The common method for applying this type of material to a roof surface is to slowly unroll the material out onto the roof while manually applying heat to the undersurface of the material before it comes in contact with the roof by means of an open flame using an industrial grade propane gas torch. The undersurface of the material is heated to melting temperature. The material is then put into contact with either the roof insulation or a paper base sheet, the latter which is mechanically attached to the roof insulation prior to application of the material. When the melted material undersurface is put into contact with either the roof insulation or the base sheet, it should form a permanent watertight bond with superior strength and durability.

The open flame application method commonly used is both economical and simple, but has two serious drawbacks: (1) the danger of roof fires and personal injury; and (2) the uneven heating of the material, causing uneven bonding to the roof surface and damage to the material itself. Temperatures associated with the open flame method can exceed 2000° F., and the danger of uncontrolled roof fires and human injury is such that many areas forbid use of this method, opting for adhesion based application systems. An adhesion based application system is safer but less desirable because it lacks the durability of the heat welded systems. Insurance premiums have skyrocketed, however, as a result of some serious accidents involving the open flame application method, resulting in some roofing contractors refusing to install this type of roofing system or to go out of business altogether. Further, uneven heating causes uneven bonding which is highly problematic when using the conventional open flame method. Not only does uneven heating ultimately decrease the durability of the welded system, but there is no way for an even highly trained and skilled roofing contractor to control the quality of the application since he cannot gauge the actual application temperature and thus be assured of optimized bonding and minimal damage to the material. In essence, the speed at which the open torch is passed over the undersurface and how quickly the material is unrolled is simply guesswork.

The industry has made a variety of attempts to resolve the problems associated with the conventional open flame application method. For instance, U.S. Pat. No. 4,743,332 to Black discloses a welding device that uses a hot plate to heat the rolled roofing material and a pressure roller to ensure adhesion to the roof surface. The problem with this device is that operationally, it involves the cumbersome process of first unrolling the desired length of rolled roofing material onto the roof surface and then feeding this material into the device via rollers which pass the material over the hot plate for melting. The other major drawback of U.S. Pat. No. 4,743,332 is that it uses an electric heating element, which is more expensive to operate than the present invention, which uses flammable gas as its source of energy. Other devices such as those described in U.S. Pat. No. 5,234,533 by Neal, U.S. Pat. No. 4,834,828 by Murphy, and U.S. Pat. No. 5,935,357 by Hubbard et at all use some type of electrical heating element rather than flammable gas.

SUMMARY OF THE INVENTION

The present invention is a device and method for welding overlapping roof materials. For purposes of this description, roof materials may be interchangeably referred to as roof membranes. The instant invention comprises a chassis, an air discharge chute and a flame distribution assembly communicating with the air discharge chute. The flame distribution assembly includes a gaseous fuel source inlet, a primary burner and an ignition source. A control unit ignites the primary burner by the ignition source. The blower connected to an inlet port of the air.discharge chute directs heat generated by the primary burner through an air discharge outlet for welding the overlapping roof membranes.

There are several advantages of the instant invention over the prior devices and methods of application. For example, this invention can eliminate the need to unroll and pre-measure the material, because the roll may be placed in a slot and unrolled as the device is operated, speeding up application time and cutting down on wasted material due to measuring inaccuracies. Further, the use of flammable gas, such as propane or butane, has a great advantage over electric heaters in that gas is economical, widely available, efficient, portable and convenient to use. Flammable gas as a source of energy for the present invention results in significant time savings because heating is instantaneous; once the invention is turned on and the gas inlet valve is opened, it can be used immediately, whereas an electrical heating element takes time to warm up and cool down. Also the present invention, unlike many of the other inventions mentioned above, can be used to apply uniform heating to the entire width of the rolled material, not to just small areas or seams.

Other embodiments of the instant invention includes a plurality of infrared temperature sensing devices located near the operator and angled to gauge the temperature of the target area between the undersurface of the rolled roof material and the interface of the weld formed therewith. The use of the temperature sensor allows the operator to accurately gauge how fast he has to pull the present invention over the roof surface to achieve an optimal bond. A light indicator can be used to signal the operator that the target area has reached the necessary welding temperature, providing better control over the welding process and assurances that heating is uniform.

This method of controlling the speed of the present invention differs substantially from that found in U.S. Pat. No. 5,072,097 by Miller, which details circuitry involved in regulating the operational speed of a welding device by measuring the temperature of the rolled roofing material as it passes over the heating plate and controlling the rate at which the material is fed through the device. More specifically, the present invention uses a simpler and more direct method of ensuring that the rolled roofing material has been sufficiently heated for proper application, by measuring the temperature directly at the area about to be welded, which is more accurate than measuring the temperature of the material as it passes over a heating element.

Accordingly, it is an object of the present invention to provide a device which is economical to use.

Another object of the present invention to provide a device which is fast and easy to operate.

It is yet another object of the present invention to provide a device which applies uniform heating to the entire width of the rolled roofing material and prevent overheating.

Still another object of the present invention is to provide a device, which is safer to use than the conventional open flame method and device.

Many other objects and features of the present invention will be obvious to those of skill in the art upon contemplation of the disclosure herein in connection with the accompanying drawings.

BRIEF DESCRIPTION OF THE DRAWINGS

It is to be understood that the drawings are designed for the purpose of illustration only and not as a definition of the limits of the instant invention, for which reference should be made to the claims appended hereto. Other features, objects and advantages of this invention will become clear from the following detailed description made with reference to the drawings in which:

DETAILED DESCRIPTION OF THE PREFERRED EMBODIMENT

Figure 1:
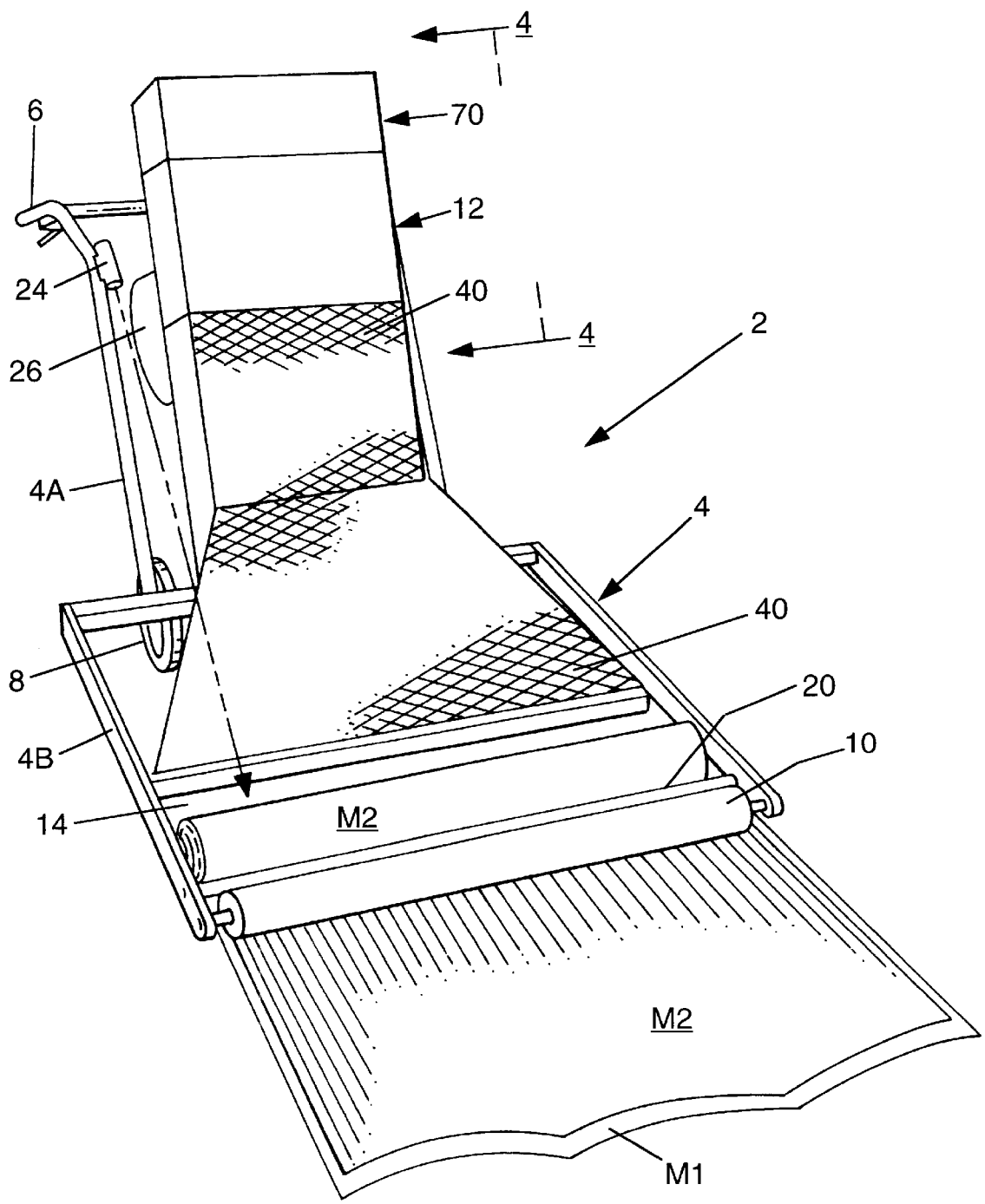
FIG. 1 is a rear perspective view.of the first embodiment of the present invention showing the overlapping roof membranes being welded.

The present invention is directed to a device for welding overlapping roof membranes M1, M2, such as modified bitumen or asphalt based roll roofing material M2 to either the roof insulation or a base sheet M1 laid on top of the roof insulation. As shown in FIG. 1, the first embodiment of the invented device for welding overlapping roof membranes includes a hot air welder 12 and a transport wagon 2 having a frame or chassis 4 and being moveably supported by two spaced wheels 8 and with a pressure roller 10. A handle 6 is attached at the top of the upper chassis 4A. Each wheel 8 is mounted to the underside of the lower chassis 4B adjacent the respective corners thereto. Further, a pressure roller 10 is rotatably mounted to the lower chassis 4B and located rearward of a discharge chute outlet port 18 relative to the direction of movement of said device. The pressure roller 10 spans the entire width of the lower chassis 4B, which is wider than the width of the roofing material being welded. The pressure roller 10 applies pressure to the weld of overlapping roof membranes M1, M2. As an alternative, the pressure roller 10 may be a scrapping member affixed to the lower chassis 4B. A guide 20 also spans the entire width of the lower chassis 4B and is directly in front of the pressure roller 10. The roofing material M2 rests within the lower chassis 4B and against the guide rod 20, and it is unrolled by the advancement of the guide 20 as the device is moved forward.

Mounted to the transport wagon 2 is the hot air welder 12, comprising a flame distribution assembly 22, a control unit 70, an air discharge chute 14 and a blower 26.

Figure 2:
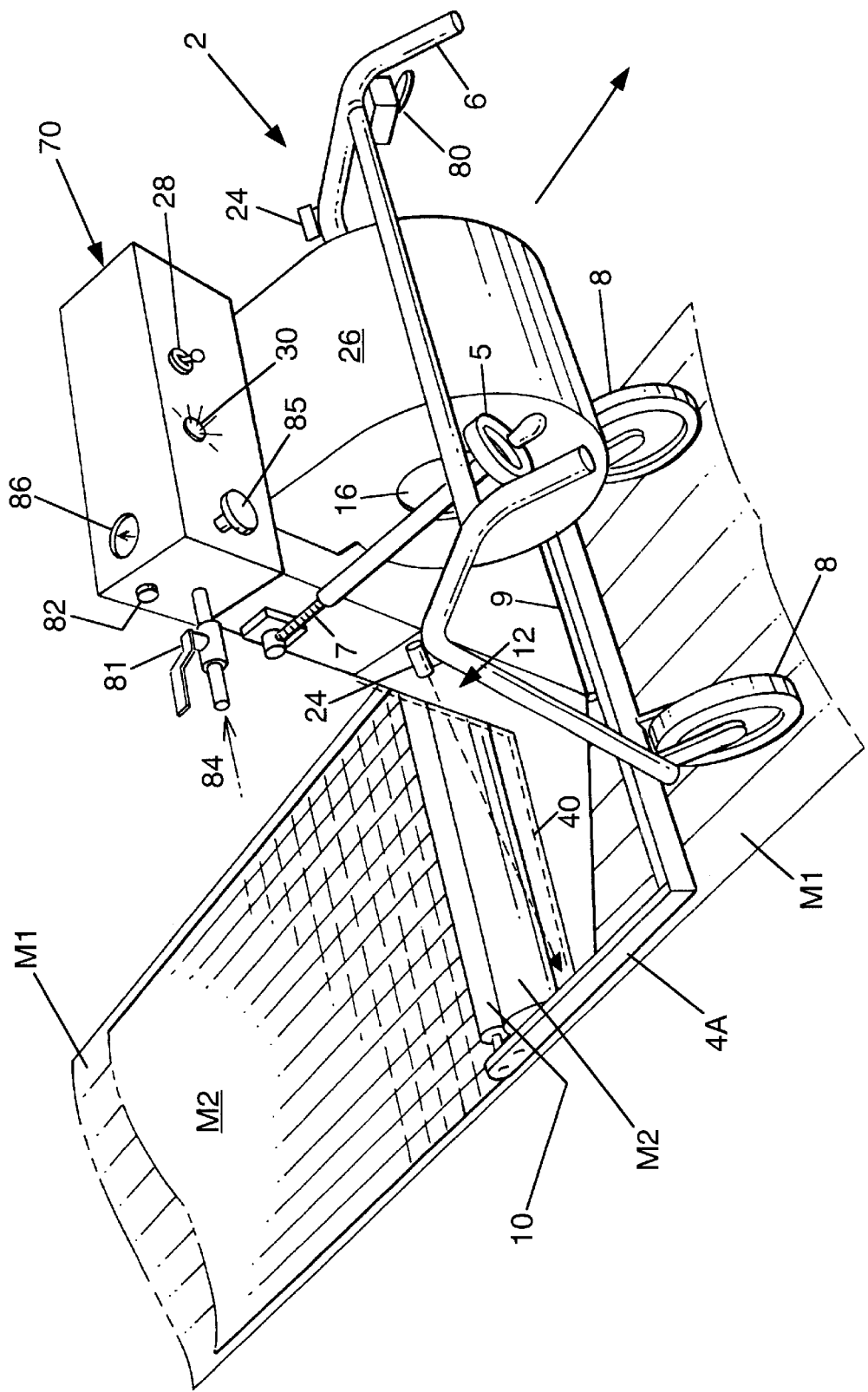
FIG. 2 is a front perspective view thereof.
Figure 4:
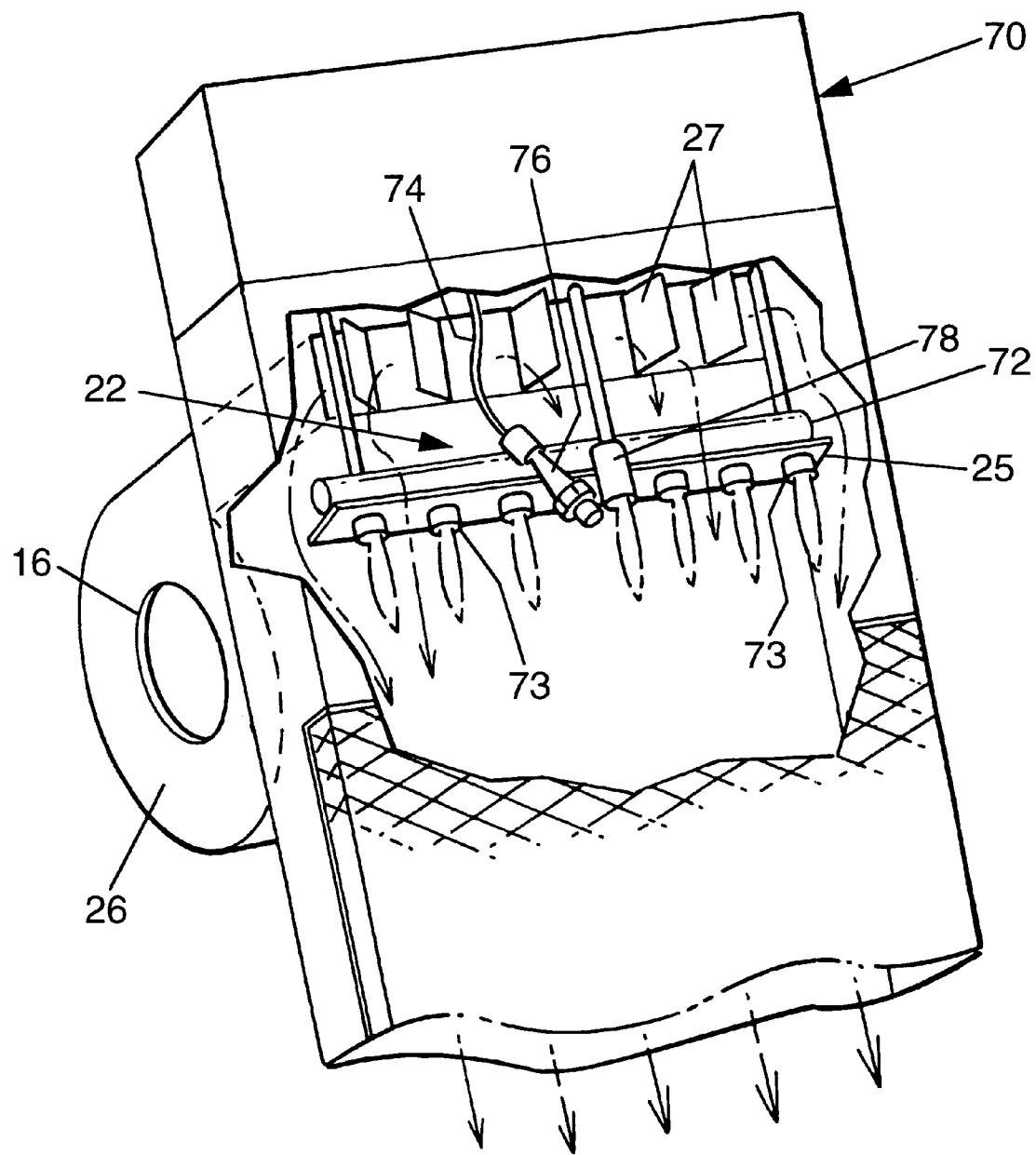
FIG. 4 is an enlarged partial perspective showing.the gas burning in the flame distribution assembly as taken from 4—4 on FIG. 1.
Figure 5:
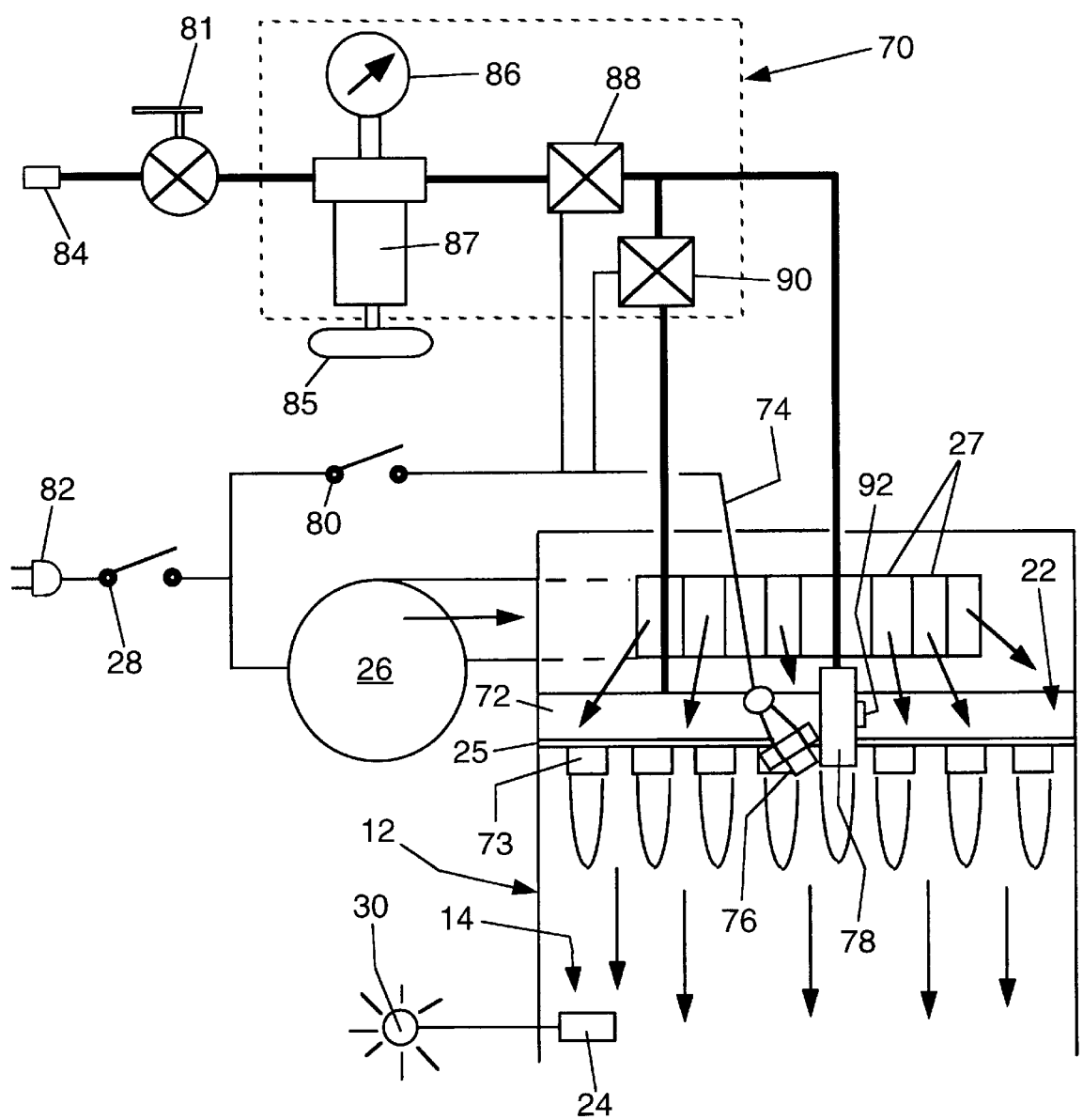
FIG. 5 is a schematic drawing showing the gas distribution and electrical requirements.

As shown in FIGS. 2 and 4, and schematically shown in FIG. 5, the flame distribution assembly 22 includes a gaseous fuel source inlet coupling or connector 84, a manual open/close valve 81, an adjustable inlet valve 87 with a pressure gauge 86 and setting hand wheel 85, a main inlet solenoid 88, an ignition source 74, a primary burner solenoid 90, and a primary burner 72. Ignition source 74 includes a pilot assembly 78 and an ignition plug 76, preferably a spark plug.

Figure 3:
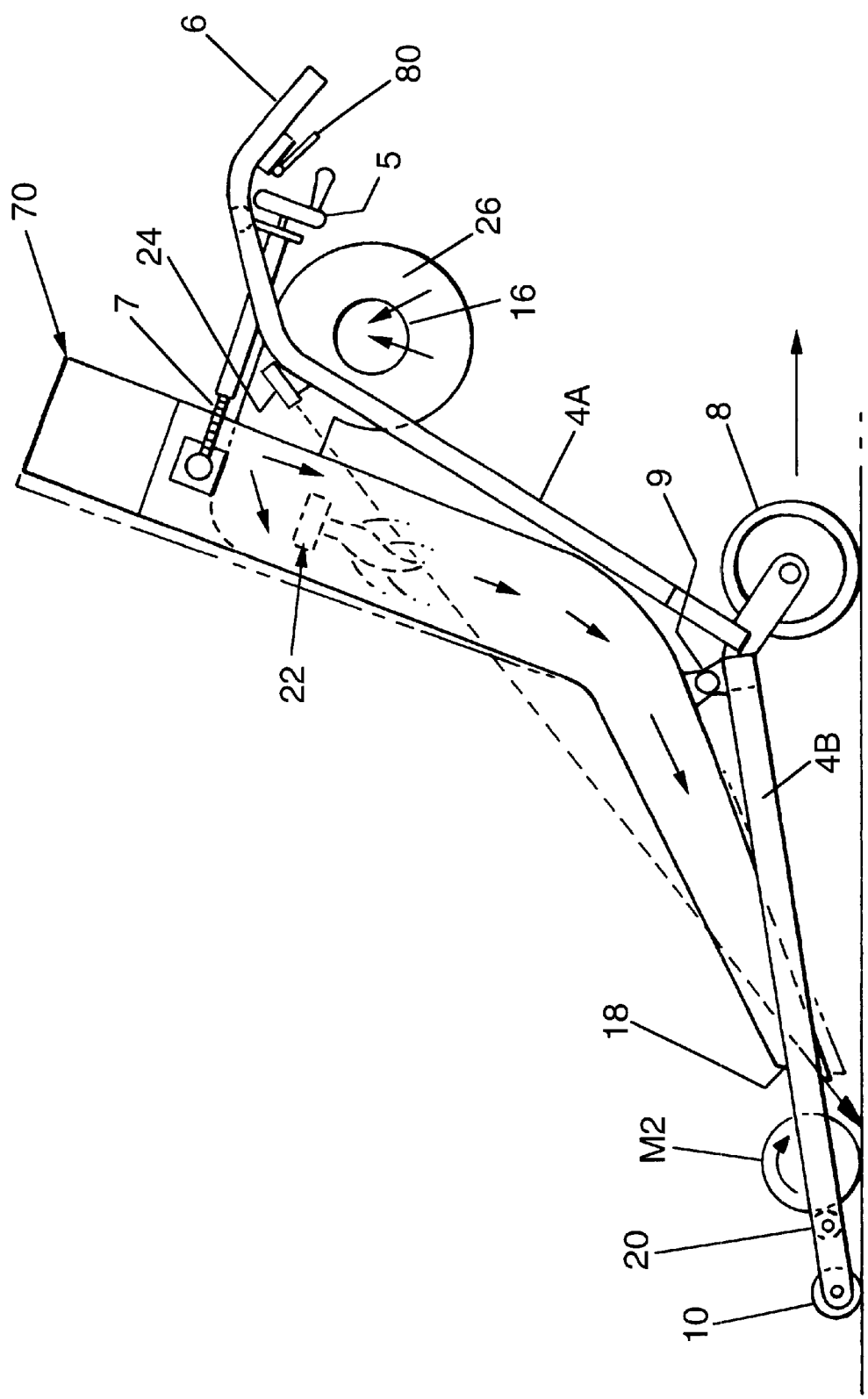
FIG. 3 is a side elevational view thereof.

As best seen in FIGS. 2 and 3 an angle adjusting screw 7 is attached to both the side of the hot air welder 12 and the chassis 4 and is operatively adjusted by manually turning knob 5 located to adjust the angle of the air discharge chute 14 about pivot point 9 to direct the discharged air from the air discharge chute outlet port 18 to the preferred target area between the overlapping roof membranes. As further seen therein, the air discharge chute 14 is operatively connected to the flame distribution assembly 22, as well as to the blower 26 at inlet port 16. Air heated by the primary burner 72 is directed by the air discharge.chute 14 and exits the outlet port 18. The height of the air discharge chute 14 leading to the outlet port 18 is tapered downward and the width of the outlet port 18 is laterally elongated so that the heated air blown through said outlet port 18 of said discharge chute 14 is pressurized and uniformly dispersed across the entire face of the undersurface of the applied roof material M2. Further, discharge chute 14 has a deflective angle between the inlet port 16 and the outlet port 18 to deflect and shield the flame generated by the flame distribution assembly 22 from being exposed outside the outlet port 18. A perforated safety screen 40 covers the exterior of the air discharge chute 14 and is used to help dissipate radiating heat.

As shown in FIG. 2 and schematically in FIG. 5, an electrical power source receptacle 82 and main power switch 28 are attached to the control unit 70 and used to supply power to operate the control unit 70, blower 26 and flame distribution assembly 22, including the solenoids 88, 90 and the ignition source 74. A thermal couple 92 in the control unit 70 is operatively connected to the main inlet solenoid 88 and to the ignition source 74 of the flame distribution assembly 22, turning off the ignition plug 76 when heat is detected and closing the main inlet solenoid 88 when heat is absent. As shown in FIGS. 1, 2 and 3 two infrared temperature sensors 24 are located on opposite sides of the transport wagon 2 and are operationally connected to a light indicator 30. The temperature sensors 24 are angled to detect the temperature of the underside of the application membrane immediately adjacent to the weld interface. The light indicator 30 communicates to the operator so that the speed of the application of the roof material M2 can be adjusted to assure heating and bonding uniformity.

The first embodiment of the instant invention is operated by an operator who stands at the front of the transport wagon 2, which is maneuvered by handle 6. The operator manually opens the fuel open/close valve 81 to allow gas, preferably propane connected by hose to the fuel source inlet coupling 84, to enter the flame distribution assembly 22. The operator can manipulate and set the gas pressure by adjusting the adjustable inlet valve 94. The main power switch 28 is then turned on. Simultaneously, the control unit 70 opens the main inlet solenoid 88 and the pilot assembly 78 is ignited by the ignition source 74. When the thermal couple 92 detects heat generated at the pilot assembly 78, the control unit 70 turns off the ignition source 74.

In operation, the operator compresses the operator control switch 80, which is reciprocally mounted on the handle 6, to start the blower 26. Within a few seconds after the blower 26 is activated (to purge the discharge chute 14 of any residual gas), the primary burner solenoid 90 is opened to feed gas to the primary burner 72. The primary burner 72 has a plurality of gas outlet orifices 73 transversing the discharge chute 14 and aligns parallel relative to the air flow therethrough. The outlet orifices 73 of primary burner 72 are then ignited by the pilot assembly 78. The blower 26 directs forced air in the air discharge chute inlet port 16 and through a series of balancing fins 27 built into the discharge chute 14 that directs the air across the primary burner 72. The forced air passes over the primary burner 72, is heated and directed down through the air discharge chute 14, exiting at the outlet port 18. The air discharge chute 14 directs the heated air towards the target area between the secured membrane attached to the roof and the rolled application membrane, melting the underside of the application membrane, and ultimately causing it to adhere to the secured membrane. As the operator pulls the transport wagon 2 forward, the pressure roller 10 presses the weld and squeezes out any air between the welded materials. The light indicator 30 allows the operator to judge how quickly to pull the application wagon across the secured membrane. For example, a green light may be used to indicate the required temperature range to melt the second roof membrane has been achieved, a red light may be used to indicate the required temperature range to melt the applied membrane has not been met. Finally, to summarize the operations, as the applied membrane is unrolled by the invented device over the secured membrane, the underside is melted by the heated air generated by the hot air welder 12, moved into position by guide 20, and ultimately pressed and welded into position by pressure roller 10.

Figure 6:
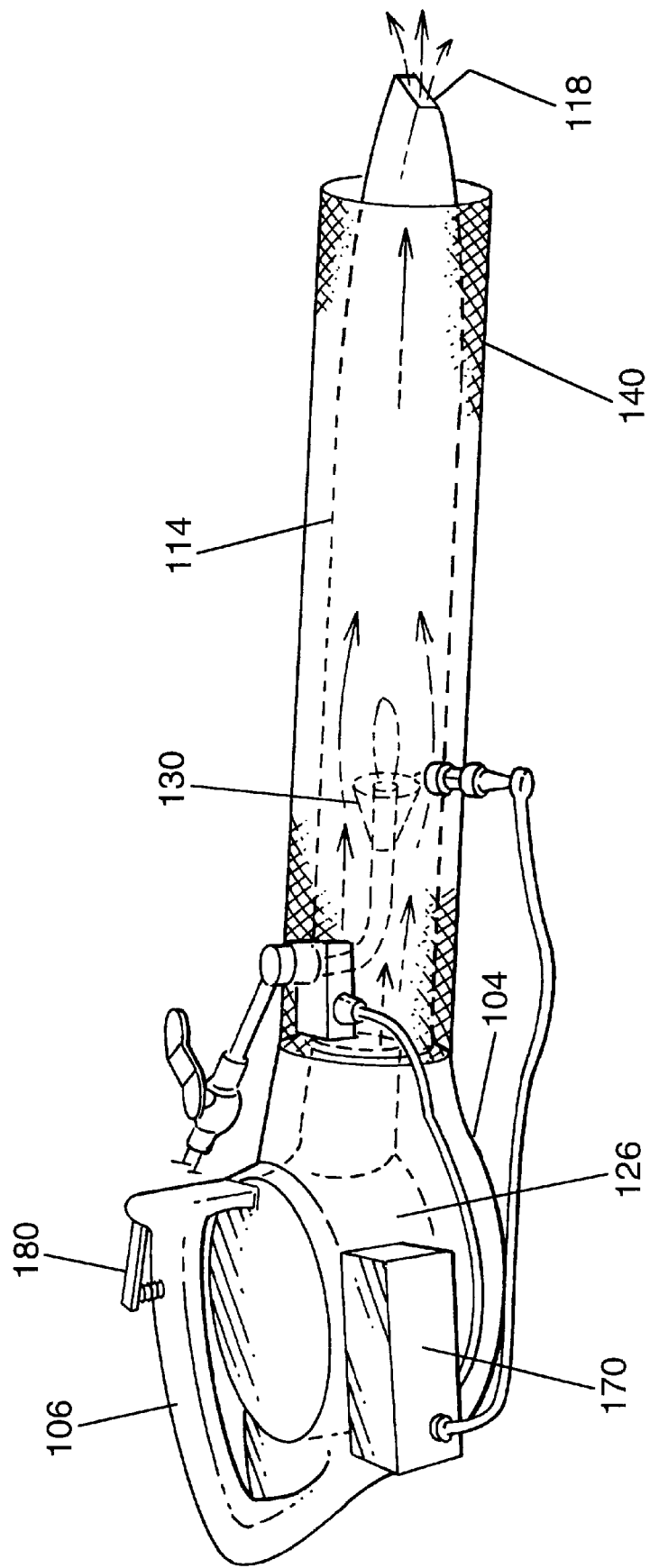
FIG. 6 is a perspective view of a second embodiment of a hand held unit.

Just as important, a second embodiment of the invention, as shown in FIG. 6, is a hand held device. The second embodiment is particularly useful in welding together the two roof membranes in areas in which use of the first embodiment might be awkward, such as at the roof edges, valleys and in other confined areas in which a hand held unit might be more preferable. The second embodiment consists of a chassis 104 having a handle 106 on top of the chassis 104 with blower 126 at one end and air discharge chute 114 attached to the opposite end. Outlet port 118 of the air discharge chute 114 is directed away from chassis 104. A spark plug is used as the ignition source 174 of the primary burner 172. A flame shield 130 is situated upstream of the ignition source 174 and primary burner 172 to shield the flame of the ignited gas and to help prevent the flame from exiting outlet port 118 by creating air eddies and disruptive currents. Further, the discharge chute 114 has an extended length that narrows to a rectangular shaped outlet port 118 to contain the flame generated therein, and a perforated safety screen 140 covers the exterior of the air discharge chute 114 to help dissipate radiating heat.

An operator using the second embodiment of the invention would support the invention by handle 106 and direct outlet port 118 at the target area between the applied and secured membranes M2, M1, respectively. Next, the blower 126 is turned on. The operator control switch 180, which is spring loaded, is then manually compressed to open the primary burner solenoid 188 and activate the ignition source 174. Unlike the embodiment discussed above, the ignition source 174 ignites the primary burner 172, instead of the pilot assembly. When heat is detected by thermal couple 192, the power to the ignition source 174 is turned off by controller unit 170.

Having described presently preferred embodiments of the invention, it is to be understood that other versions are possible. Therefore, the spirit and scope of the appended claims should not be limited to the description of the preferred versions contained herein.

What is claimed is:

1. A device for welding first and second overlapping roof membranes, comprising:

a chassis having a front end and a back end, said front end having a handle;

a guide attached at the back of the chassis to align the first roof membrane mounted in a chassis opening, said guide being positioned to engage said first roof membrane to unroll over the second membrane as the device is moved forward;

a pressure roller attached to said chassis rearward of an air discharge chute;

said air discharge chute having an inlet port and an outlet port, the air discharge chute outlet port being positioned at the back end of said chassis relative to a direction of movement of said device, said outlet port of said air discharge chute is tapered and elongated having air balancing fins so that air discharged through said outlet port of said discharge chute is evenly dispersed;

a flame distribution assembly within said air discharge chute, said flame distribution assembly having a primary burner and an ignition source, the discharge chute having a deflective means between the inlet port and the outlet port to contain within the discharge chute a flame generated by the flame distribution assembly;

a control unit to ignite said primary burner by said ignition source;

a gaseous fuel source inlet connection being attached to said flame distribution assembly;

a blower connected at said inlet of said air discharge chute so that heat generated by the primary burner is forced by the blower and directed through said air discharge outlet for welding said overlapping roof membranes; and an operator control switch reciprocally mounted on the handle, the operator control switch engagably communicating with a purging sequence mechanism to start the blower before igniting said primary burner.

2. The device of claim 1, wherein the ignition source includes an ignition plug and a pilot assembly, the control unit communicating with the ignition plug and having a thermal couple to detect heat generated by the pilot assembly.

3. The device of claim 1, further comprising a means for moveably supporting said device.

4. The device of claim 3, wherein the means for moveably supporting said device comprises a wheel.

5. The device of claim 1, wherein said deflective means between the inlet port and the outlet port shields the flame generated by the flame distribution assembly.

6. The device of claim 1, wherein said deflective means is a deflective angle between the inlet port and the outlet port.

7. The device of claim 1, wherein the air discharge chute is attached to the chassis at a pivot point used to provide height adjustment of the discharge chute outlet port.

8. The device of claim 1, wherein the primary burner has a plurality of gas outlet orifices aligned substantially perpendicular to air flow from the blower to the discharge chute outlet port.

9. The device of claim 1, wherein the air discharge outlet has a width of at least 24 inches.

10. The device of claim 1, further comprising a pressure wheel rotatably attached to said chassis and located rearward of said discharge chute outlet port relative to the direction of movement of said device and being capable of applying pressure to the weld of overlapping roof membranes.

11. The device of claim 1, further comprising an infrared temperature sensor to measure the temperature immediately adjacent to a weld interface of the overlapping roof membranes.

12. The device of claim 11, wherein the infrared temperature sensor communicates with a light indicator.

13. A device for applying and welding an overlapping roof membrane to a secured membrane, the device comprising:
   a chassis having a front and a back relative to the direction of movement of said device;
   a guide attached at the back of the chassis rearward of an opening in the chassis for positioning the unrolled overlapping roof membrane, the opening in the chassis being aligned with the air discharge outlet port, in operation the guide engages an outside cylindrical surface of the overlapping roof membrane causing the overlapping roof membrane to unroll over the secured membrane as the device is moved forward;
   an air discharge chute pivotally attached to the chassis at a pivot point, the air discharge chute having a cross sectional area defined by a width and height, the air discharge chute further comprising an inlet and outlet, the air discharge chute outlet being positioned at the back of said chassis and said height of the discharge chute being tapered downwardly and the width of the discharge chute extending outwardly so that said outlet has at least the same width as the overlapping roof membrane;
   a flame distribution assembly within said air discharge chute, said flame distribution assembly having a gaseous fuel inlet coupling, primary burner and an ignition source, the ignition source including an ignition plug and a pilot assembly, said primary burner having a plurality of gas outlet orifices transversing the discharge chute relative to air flow therethrough;
   a control unit to ignite said primary burner by said ignition source, the control unit having a detector to detect heat generated by the pilot assembly;
   an infrared temperature sensor positioned to sense the temperature immediately adjacent to a weld interface of the secured and overlapping membranes;
   a blower connected at said discharge chute inlet so that heat generated by the primary burner is forced by the blower and directed through said air discharge outlet for welding said overlapping roof membrane to said secured membrane, the discharge chute having a deflective means between the inlet port and the outlet port to contain within the discharge chute a flame generated by the flame distribution assembly; and
   an angle adjusting screw between the air discharge chute and the chassis, the adjusting screw engaging the discharge chute to manipulate the discharge chute about the pivot point at the chassis to direct the heat from the air discharge chute outlet port to a preferred target area between the overlapping roof membrane and the secured roof membrane.

14. The device of claim 13, further comprising a pressure means attached to said chassis rearward of said air discharge chute outlet and being capable of applying pressure to the weld between said secured and overlapping roof membranes.

15. The device of claim 14, wherein the pressure means is a pressure roller.

16. The device of claim 14, wherein the deflective means comprises a deflective angle between said inlet and outlet whereby the flame generated by said flame distribution assembly is contained within the discharge chute by being deflected.

17. The device of claim 14, wherein said flame distribution assembly has a pressure gauge and an adjustable inlet valve to regulate the heat generated by the flame distribution assembly.

18. The device of claim 14, further comprising at least one wheel attached to the chassis.

19. The device of claim 14, wherein the infrared temperature sensor communicates with a light indicator.

20. An apparatus for unrolling and welding an overlapping roof membrane to a secured membrane, comprising:
   a chassis having wheels and a handle for mobility, the chassis having a front end and a back end relative to a direction of movement of said apparatus, the handle being attached to the front end;
   a guide and chassis opening for mounting the overlapping roof membrane in a rolled state at the back end of the chassis, the guide is attached to the chassis rearward of the opening in the chassis so that the guide forces said roof membrane to unroll over the secured membrane as the apparatus is moved forward;
   an air discharge chute having an inlet port and an outlet port, said outlet port of said air discharge chute is tapered outward and elongated downwardly so that air blown through said outlet port of said discharge chute is dispersed substantially across a mating face of said overlapping roof membrane before welding as the overlapping roof membrane unrolls over the secured membrane;
   a flame distribution assembly within said air discharge chute, said flame distribution assembly having a burner with an ignition source, a fuel source inlet being attached to said flame distribution assembly;
   an air discharge chute deflection means between the inlet port and the outlet port to contain within the discharge chute a flame generated by the flame distribution assembly;
   a control unit to ignite said burner by said ignition source;
   a blower connected at said inlet port so that heat generated by the burner is forced by the blower and directed through said air discharge outlet port to heat the overlapping roof membrane as it unrolls over the secured membrane;
   a pressure means for applying a force to securely weld the heated overlapping roof membrane to the secured membrane, the pressure means being attached to said chassis and located rearward of said discharge chute outlet port relative to the direction of movement of said apparatus, the guide being positioned to align the rolled overlapping roof membrane between the air discharge outlet port and pressure means; and
   an operator control switch reciprocally mounted on the handle, the operator control switch engagably communicating with a purge mechanism before activating the control unit to ignite said primary burner.

21. The apparatus of claim 20, further comprising balancing fins in the air discharge chute.

* * * * *